United States Patent
Ohkubo

(10) Patent No.: US 8,164,787 B2
(45) Date of Patent: Apr. 24, 2012

(54) THERMAL TRANSFER RECORDING DEVICE AND IMAGE FORMATION METHOD

(75) Inventor: Takayuki Ohkubo, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 791 days.

(21) Appl. No.: 12/162,797

(22) PCT Filed: Jan. 30, 2007

(86) PCT No.: PCT/JP2007/051440
§ 371 (c)(1),
(2), (4) Date: Dec. 23, 2008

(87) PCT Pub. No.: WO2007/088831
PCT Pub. Date: Aug. 9, 2007

(65) Prior Publication Data
US 2009/0147277 A1    Jun. 11, 2009

(30) Foreign Application Priority Data

Jan. 31, 2006 (JP) .................................. 2006-021881
Sep. 29, 2006 (JP) .................................. 2006-266388

(51) Int. Cl.
*G06F 15/00* (2006.01)
(52) U.S. Cl. ........................... 358/1.9; 358/2.1; 382/167
(58) Field of Classification Search .................. 358/1.9, 358/2.1; 382/167
See application file for complete search history.

(56) References Cited

U.S. PATENT DOCUMENTS

| 5,341,228 A | 8/1994 | Parker et al. |
| 5,519,426 A | 5/1996 | Lukis et al. |
| 5,963,714 A * | 10/1999 | Bhattacharjya et al. ........ 358/1.9 |
| 6,776,489 B2 * | 8/2004 | Suzuki ............................. 353/20 |
| 2004/0239996 A1 * | 12/2004 | Hayashi ........................ 358/3.03 |

FOREIGN PATENT DOCUMENTS

| EP | 0 322 680 | 12/1988 |
| EP | 0 940 972 | 9/1999 |
| EP | 1 946 932 | 7/2008 |
| JP | 11-177826 | 7/1999 |
| JP | 3595603 | 9/2004 |
| JP | 2005-96406 | 4/2005 |
| JP | 2006-279596 | 10/2006 |

OTHER PUBLICATIONS

Japanese Patent Abstract of Publication No. 08-207892 dated Nov. 22, 1996. Deforges, O. et al.; "A Generic Systolic Processor for Real Time Grayscale Morphology", IEEE 2000, pp. 3331-3334.
Poikonen, J.; "Implementing Grayscale Morphological Operators With a Compact Ranked Order Extractor Circuit", pp. 646-653.
Supplementary European Search Report issued in European Patent Application No. 07707671.9 on Aug. 27, 2009.

* cited by examiner

*Primary Examiner* — Twyler Haskins
*Assistant Examiner* — Michael Burleson
(74) *Attorney, Agent, or Firm* — Antonelli, Terry, Stout & Kraus, LLP.

(57) ABSTRACT

A control section 11 of an image data generation apparatus 1 of a thermal transfer recording apparatus S performs resolution conversion processing, gradation conversion processing, CMYK separation processing, contour expansion processing, image sift processing, dot processing, and image reverse shift processing for entered image data 5 stored in an image memory 33 of a storage section 12. The control section 11 sends the produced image data to a printing section 2, prints it on an intermediate transfer medium, and transfers it onto a polycarbonate film or the like. Through contour expansion processing, contours of color images masked by a black background are expanded by numbers of pixels which differ among the colors, and masked by the black background.

16 Claims, 16 Drawing Sheets

FIG.7

| | CONTOUR EXPANSION PROCESSING PARAMETER | | | |
|---|---|---|---|---|
| | C | M | Y | K |
| NUMBER OF TIMES OF FILTER PROCESSING | 4 | 2 | 3 | 5 |

FIG.10
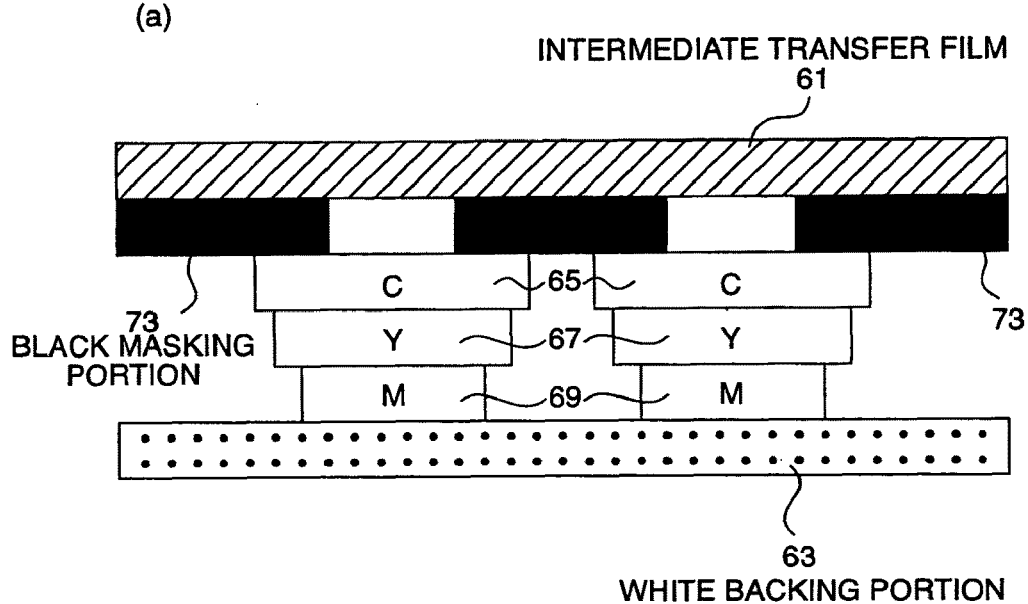
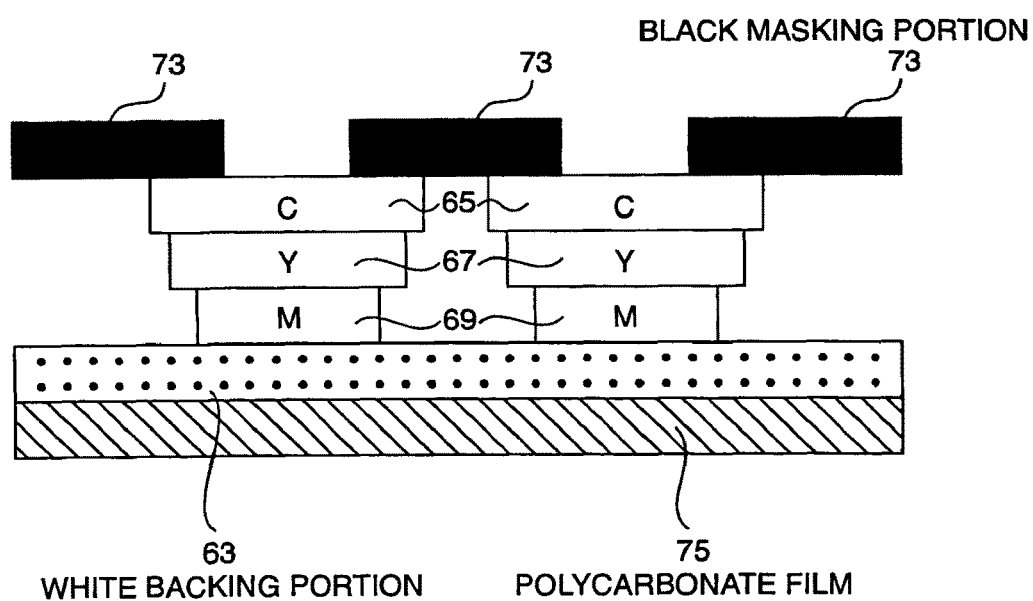

FIG.12

|  | CONTOUR EXPANSION PROCESSING PARAMETER | | | |
|---|---|---|---|---|
|  | C | M | Y | K |
| IMAGE $G_5 \rightarrow G_7$ | 7 | 3 | 5 | 9 |
| IMAGE $G_6 \rightarrow G_8$ | 8 | 4 | 6 | 10 |

FIG.14

| X | CONTOUR EXPANSION REGION DESIGNATION PARAMETER | | | |
|---|---|---|---|---|
| | C | M | Y | K |
| GRADATION VALUE Px | 0 | 0 | 0 | 0 |

FIG.15
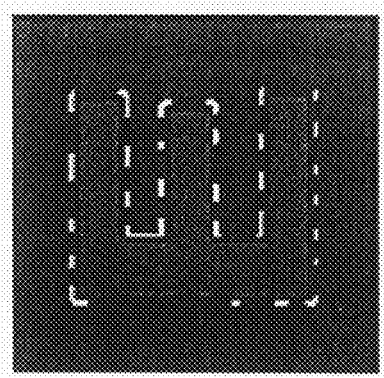
(c) ADHESION FAILURE
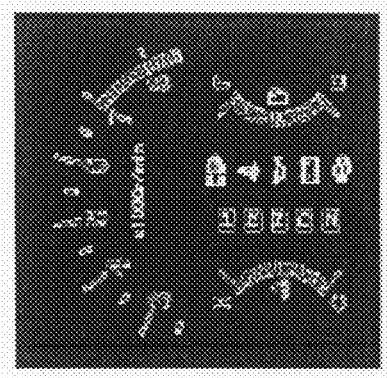
(b) WHITE UNPRINTED PORTIONS AT BOUNDARIES ATTRIBUTABLE TO SHIFT OF PRINTING POSITION
(a) ORIGINAL IMAGE DATA

FIG.16
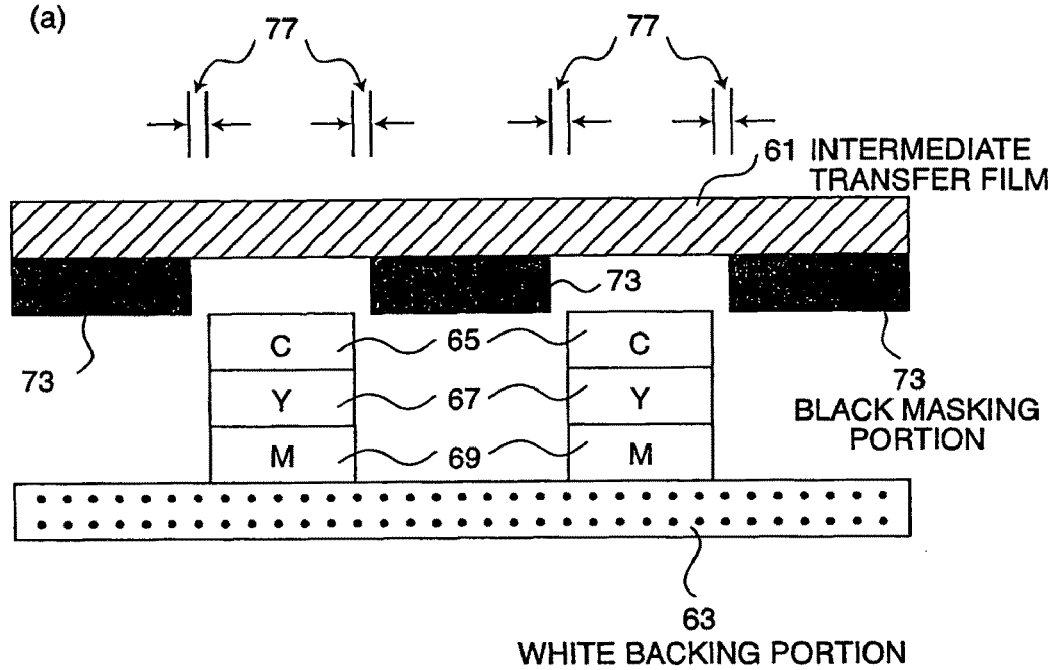
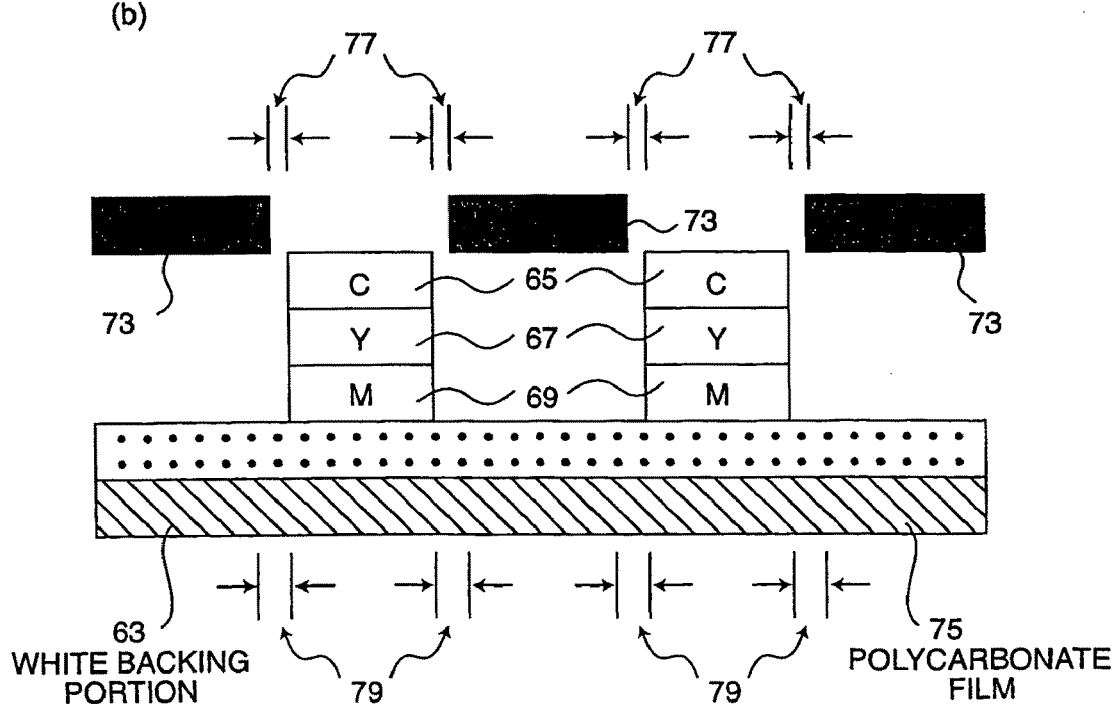

THERMAL TRANSFER RECORDING DEVICE AND IMAGE FORMATION METHOD

TECHNICAL FIELD

The present invention relates to a thermal transfer recording apparatus and an image forming method, and more particularly, to a thermal transfer recording apparatus and an image forming method which can improve the printing quality of a black-masked image recorded on a polycarbonate film or the like by means of thermal transfer.

BACKGROUND ART

A conventional thermal transfer printer is configured such that thermal heads, serving as heating elements, are arranged one-dimensionally (main scanning direction), and recording paper or film is successively fed in a printing direction (sub scanning direction).

The back of an ink ribbon superposed on the recording paper or film is heated by means of the thermal heads in order to transfer the ink (color material) of the ink ribbon onto the recording paper or film by sublimating or melting the ink.

Each of the thermal heads is a composed of a plurality of heat-generating resistors formed on a substrate in a row. The thermal transfer printer includes a plurality of ink ribbons corresponding to a plurality of colors. The inks of the ink ribbons of the plurality of colors (e.g., yellow Y, magenta M, cyan C, and black K) are transferred in a superposed state onto the recording paper at the same position, to thereby perform color printing. For example, the plurality of ink ribbons are disposed to be rotatable, and an ink ribbon to undergo thermal transfer is moved to the position of the thermal heads.

Each of the thermal heads can control the amount of applied heat stepwise. However, when it melts and transfers a color material, it is susceptible to the density of dots as well as to adjacent dots, and encounters difficulty in controlling gradation on a pixel-by-pixel basis. Therefore, the melting and transfer of the color material is controlled by use of two values; i.e., a value representing "to be transferred" and a value representing "not to be transferred." In such a case, dots of a certain size are drawn, whereby a gradation is expressed through area modulation. For example, there are used a halftone generation method in which a rational tangent matrix is used, and a super-cell-scheme halftone generation method which is based on the former method and in which a plurality of matrices are used in order to virtually increase the number of gradation levels.

In a known method, an image signal is processed by means of a correction circuit for image-signal processing which includes a gradation correction table, the processed image signal and an image signal from an external apparatus are selectively output through switching, and the output image signal is subjected to gradation processing to be output. In another known method, input image data are spatially divided into matrices, and gradation conversion is performed on the basis of a growth-start gradation value of each pixel determined in accordance with the priority order sequentially determined from a pixel located at the center of each matrix toward pixels located at the outer edge of the matrix (see, for example, Patent Document 1 and Patent Document 2).

Patent Document 1: Japanese Patent Application Laid-Open (kokai) No. H11-177826

Patent Document 2: Japanese Patent Application No. 2005-096406

DISCLOSURE OF THE INVENTION

Problems to be Solved by the Invention

An increased resolution of a thermal head (e.g., from 300 dpi to 600 dpi or more) improves the resolution of images. However, in such a case, the influence of heat accumulation of the thermal head increases, and smooth halftone expression becomes difficult because of blurring of dots or the like.

Further, in a case where an image printed on an intermediate transfer film is transferred to a polycarbonate film or the like, there arises a problem in that printing miss (formation of a white unprinted portion) and an adhesion failure occur.

That is, when original image data including a color pattern with a black background as shown in FIG. 15(a) is to be printed on a polycarbonate film 75, as shown in FIG. 16, the original image data is first separated into C, M, Y, and K images which constitute the pattern portion and a K image (black masking portion) which constitutes the black background; and the C, Y, and M images and the black masking portion 73 (K) are printed on an intermediate transfer film 61 in a superposed manner, and white backing is applied thereon (a white backing portion 63).

The images of the intermediate transfer film 63 prepared in the above-described manner are transferred onto the polycarbonate film 75, as shown in FIG. 16(b).

At that time, white unprinted portions 77 are produced because of a positional shift of boundaries between dot images (65, 67, 69) of C, Y, and M and the black masking portion 73 during printing. That is, as shown in FIG. 15(b), white unprinted portions remain at the boundaries between the black background and the color image.

Further, when the white backing portion 63, the ink of the black masking portion 73, the inks of C, Y, and M (65, 67, 69), which are superposed on the intermediate transfer film, are transferred onto the polycarbonate film 75 as shown in FIG. 16, an adhesion failure 79 occurs at the black masking portion due to a step produced by superimposition of the inks (FIG. 15(c)).

The present invention has been accomplished in view of such problems, and an object of the present invention is to provide a thermal transfer recording apparatus and an image forming method which are adapted to transfer an image with a black background onto a polycarbonate film or the like, and which can print a smooth halftone image which is free of adhesion failure and formation of a white unprinted portion at a boundary between a color image portion and a black background portion and which is not influenced by heat accumulated in a thermal head.

Means for Solving the Problems

An invention for achieving the above-described object is a thermal transfer recording apparatus including a thermal head, characterized by comprising image data acquisition means for acquiring original image data of RGB; color separation means for performing gradation conversion and then color separation for the original image data of RGB acquired by the image data acquisition means so as to obtain image data sets of C, M, Y, and K; contour expansion means for expanding the image data sets obtained by the color separation means by different numbers of pixels, respectively; shift means for shifting the image data sets, which have been expanded by the contour expansion means, by different numbers of pixels, respectively; dot conversion means for performing dot conversion processing for the image data sets shifted by the shift means; printing data generation means for superposing the image data sets processed by the dot conversion means so as to generate printing data; and printing means for printing the printing data generated by the printing data generation means so as to obtain a printed object.

The contour expansion means may be operated after the shift means.

The contour expansion means replaces a value of each pixel contained in each of the image data sets obtained through color separation with a minimum value of brightness of pixels around the pixel, and repeats this processing a predetermined number of times determined for each of the image data sets obtained through color separation, to thereby expand each of the image data sets by pixels, the number of which corresponds to the number of times.

Image data obtained by performing gradation conversion on the input original image data is separated into image data sets of C (cyan), M (magenta), Y (yellow), and K (black); and contour portions of the image data sets are expanded by the contour expansion means. With this processing, for example, high quality printing of an image with a black background can be performed without forming a white unprinted portion at a contour portion. Further, since the number of pixels by which the contour is expanded is changed among the image data sets of C (cyan), M (magenta), Y (yellow), and K (black), adhesion failure which occurs due to a large thickness of color ink layers printed in a superposed manner becomes less likely to occur.

A second invention is an image forming method characterized by comprising the steps of acquiring original image data of RGB; performing gradation conversion and then color separation for the original image data of RGB so as to obtain image data sets of C, M, Y, and K; expanding the image data sets obtained through color separation by different numbers of pixels, respectively; shifting the expanded image data sets by different numbers of pixels, respectively; performing dot conversion processing for the shifted image data sets; superposing the image data sets having undergone the dot conversion so as to generate printing data; and printing the printing data so as to obtain a printed object.

Effects of the Invention

According to the present invention, there can be provided a thermal transfer apparatus which is adapted to transfer an image with a white backing or a black background onto a polycarbonate film or the like, and which can print a smooth halftone image which is free of adhesion failure and formation of a white unprinted portion at a boundary between a color image portion and a black background portion and which is not influenced by heat accumulated in a thermal head.

BRIEF DESCRIPTION OF THE DRAWINGS

FIG. 7 Table showing an example of contour expansion processing parameters.

FIG. 10 Illustrations used for explaining the contour expansion processing.

FIG. 12 Table showing an example of contour expansion processing parameters according to the second embodiment.

FIG. 14 Table showing an example of contour expansion region designation parameters.

FIG. 15 Example of conventional printing.

FIG. 16 Conventional printing method.

DESCRIPTION OF REFERENCE NUMERALS

Figure 1:
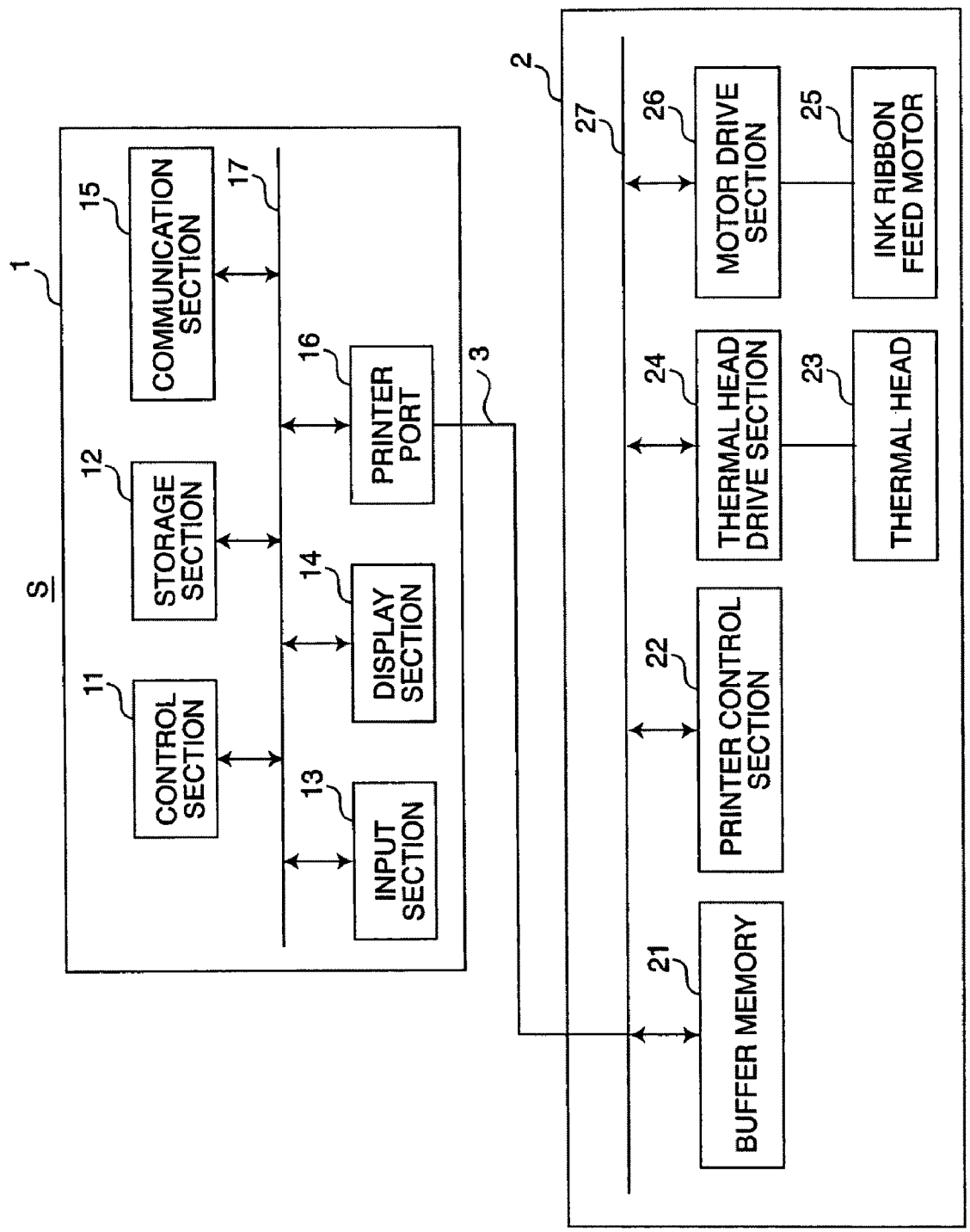
FIG. 1 Diagram showing the configuration example of a thermal transfer recording apparatus S according to an embodiment.

S . . . thermal transfer recording apparatus
1 . . . image data generation apparatus
2 . . . printing section
5 . . . image data
11 . . . control section
12 . . . storage section
23 . . . thermal head
33 . . . image memory
37 . . . processing parameter memory
35 . . . image processing

BEST MODE FOR CARRYING OUT THE INVENTION

Preferred embodiments of the present invention will next be described in detail with reference to the drawings.

1. The Configuration and Functions of a Thermal Transfer Recording Apparatus

First, the configuration and functions of a thermal transfer recording apparatus according to a first embodiment of the present invention will be described with reference to FIGS. 1 and 2.

FIG. 1 is a diagram showing the configuration example of a thermal transfer recording apparatus S according to the present embodiment. The thermal transfer recording apparatus S is composed of an image data generation apparatus 1 and a printing section 2.

The image data generation apparatus 1 may be a general purpose computer or the like, and includes a control section 11, a storage section 12, an input section 13, a display section 14, a printer port 16, a communication section 15, etc. The storage section 12 is a hard disk apparatus or the like, and stores image data, various programs for image processing which is executed by the control section 11 and will be described later, various parameters for image processing, etc.

The input section 13 includes a keyboard, a mouse, etc., and is used for inputting user's instructions or the like. The display section 14 is a display or the like and displays various data. The communication section 15 includes a communication port and a communication control apparatus and establishes a connection with a network or other apparatuses. The printing section 2 is connected to the printer port 16 via a connection cable 3 such as a USB cable. These structural components are connected with one another via a bus 17.

The control section 11 is composed of a CPU (central processing unit), RAM (random access memory), ROM (read only memory), etc. The control section 11 reads and executes an image processing program of the present invention stored in, for example, the storage section 12, so as to control the above-described structural components, and function as image data acquisition means, color separation means, contour expansion means, shift means, dot conversion means, and printing data generation means of the present invention. These means will be described later.

The printing section 2 includes a buffer memory 21, a printer control section 22, a thermal head 23, a thermal head drive section 24 for driving the thermal head 23, an ink ribbon feed motor 25, and a motor drive section 26 for driving the ink ribbon feed motor 25. These structural components are connected with one another via a bus 27.

The buffer memory 21 temporarily stores image data transferred from the image data generation apparatus 1 via the connection cable 3.

The printer control section 22 functions as the printing means for controlling the transfer of the image data temporarily stored in the buffer memory 21 to the thermal head 23, and for printing an image on a recording sheet by controlling the thermal head drive section 24 and the motor drive section 26.

In order to print the image on the recording sheet, the printer control section 22 sets the energy (which changes from 0 to 100%, for example) applied to the thermal head 23 in accordance with the image data. At the time of image printing, the thermal head 23 applies to an ink ribbon a heat which corresponds to the set energy, whereby ink at a position where the heat is applied melts or sublimates, and adheres to the recording sheet. The recording sheet may be a sheet of paper, an intermediate film, or a polycarbonate sheet.

Further, four types of ink ribbons; i.e., ink ribbons of C (cyan), M (magenta), Y (yellow), and K (black), are provided, and inks of these ribbons are transferred onto the recording sheet in a superposed manner, whereby color printing is effected.

Figure 2:
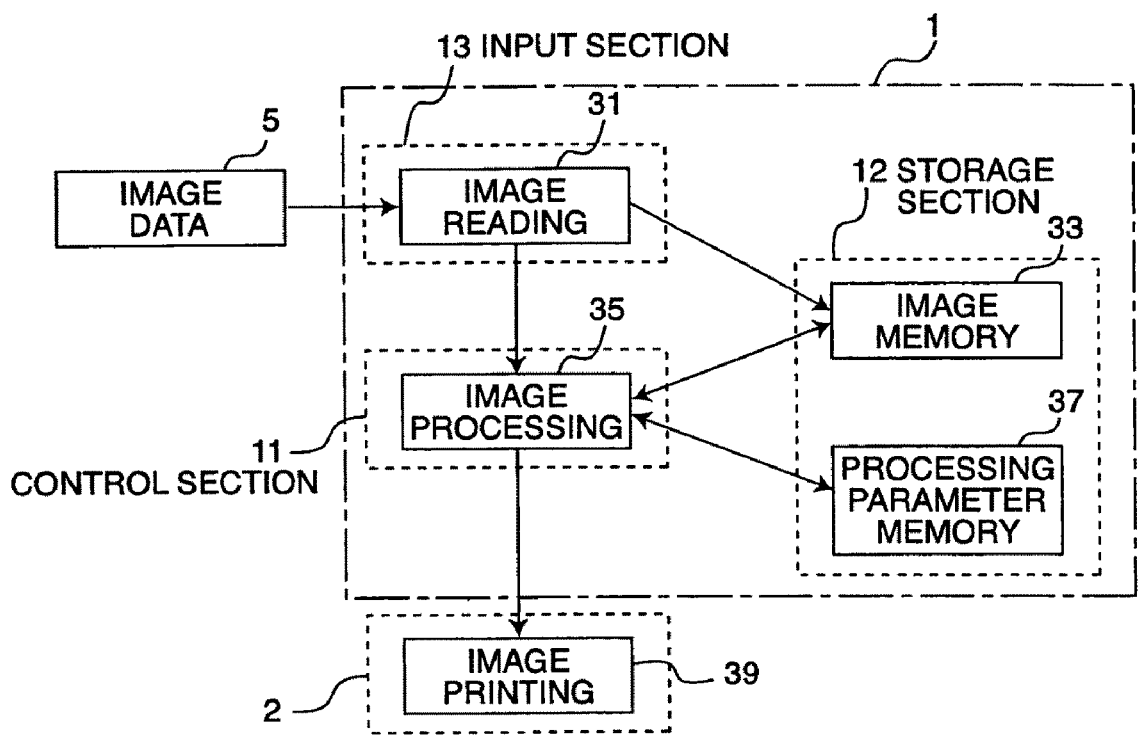
FIG. 2 Diagram showing the functional structure of the thermal transfer recording apparatus S.

FIG. 2 is a diagram showing the functional structure of the thermal transfer recording apparatus S.

The image data generation apparatus 1 of the thermal transfer recording apparatus S has a function of image reading 31 performed at the input section 13, and a function of image processing 35 performed at the control section 11. The storage section 12 has an image memory 33 for storing image data and a processing parameter memory 37 for storing processing parameters used in the image processing.

The printing section 2 also has a function of image printing 39.

The input section 13 performs the image reading processing 31 for reading image data 5, and stores the read image data into the image memory 33 of the storage section 12. Simultaneously, the input section 13 sends the read image data to the control section 11. The control section 11 performs the image processing 35 on the image data 5.

The image processing 35 includes various processing steps, such as steps for resolution conversion processing, gradation conversion processing, CMYK separation processing, contour expansion processing, image sift processing, dot processing, and image reverse shift processing. The image processing is performed for the image data within the image memory 33 of the storage section 12 by making use of the processing parameters determined for each processing step and stored in the processing parameter memory 37, whereby final image data are obtained. Image data produced in the course of the processing are also stored in the image memory 33 of the storage section 12. The control section 11 sends the finally obtained image data to the printing section 2.

The printing section 2 receives the finally obtained image data as printing data. In response thereto, the printer control section 22 controls the thermal head 23 and the ink ribbon feed motor 25, to thereby perform image printing 39.

2. Flow of Image Data Generation Processing

Figure 3:
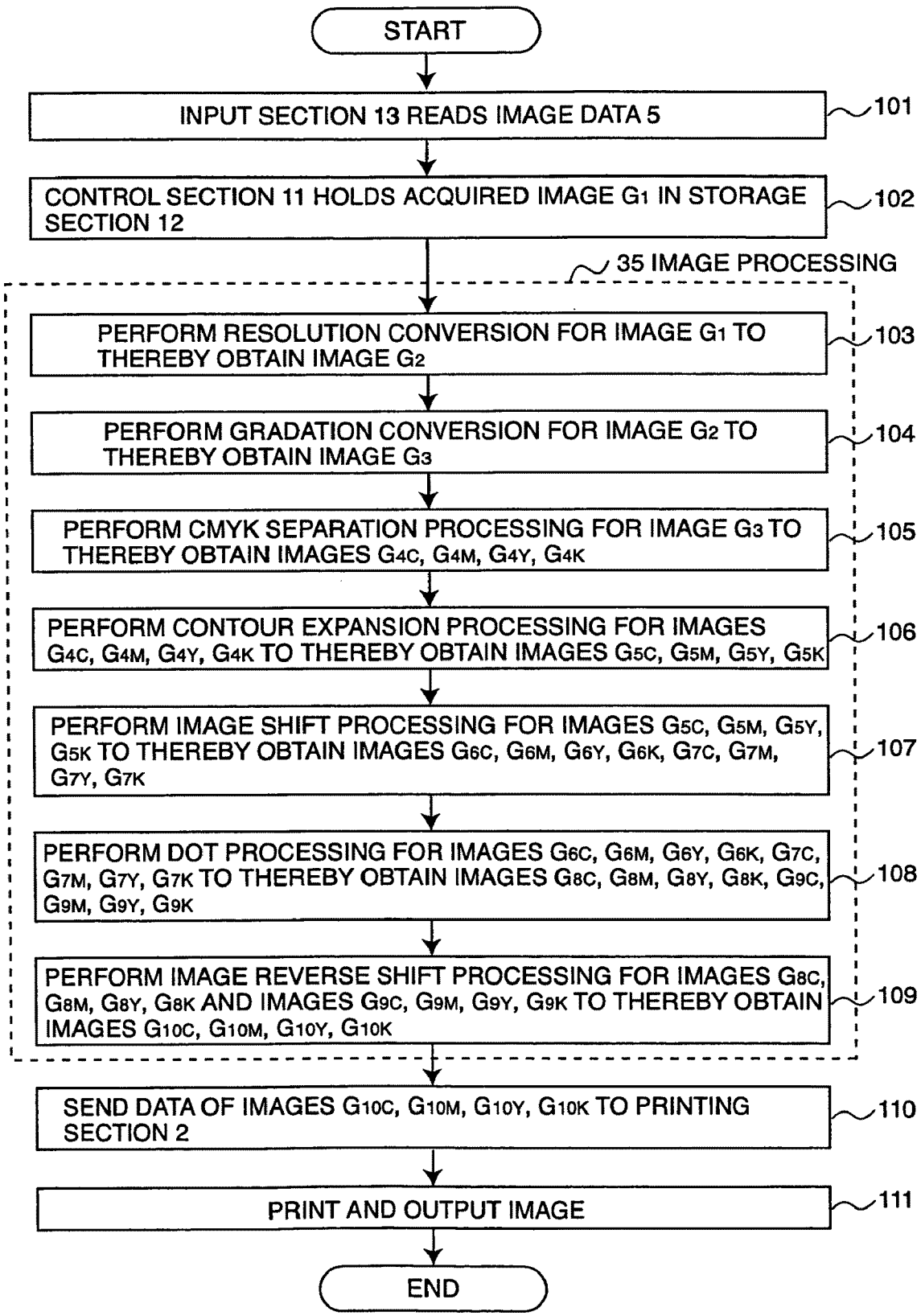
FIG. 3 Flowchart showing the flow of processing of an image data generation apparatus 1.
Figure 4:
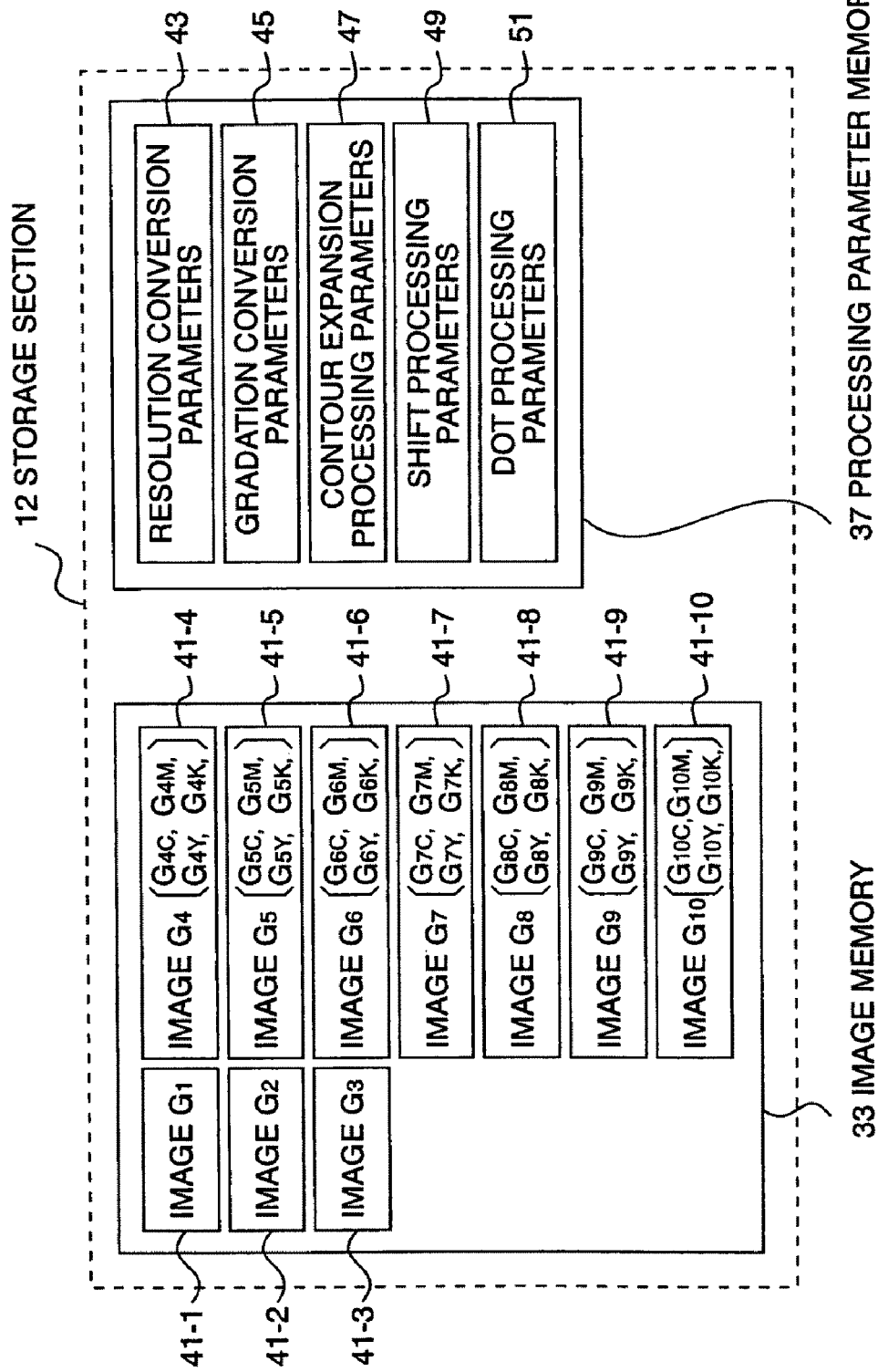
FIG. 4 Diagram showing the details of a storage section 12 of the image data generation apparatus 1.

Next, the flow of image data generation processing according to the present embodiment will be described with reference to FIGS. 3 and 4. FIG. 3 is a flowchart showing the flow of processing of the image data generation apparatus 1. FIG. 4 is a diagram showing the details of the storage section 12 of the image data generation apparatus 1.

The input section 13 of the image data generation apparatus 1 reads the image data 5 (step 101); and the control section 11 holds the acquired image data $G_1$ (41-1) in the image memory 33 of the storage section 12 (step 102).

Next, the control section 11 executes the image processing 35. First, the control section 11 performs the resolution conversion processing; i.e., converts the resolution of the image data $G_1$ (41-1) in accordance with the resolution of the printing section 2 to thereby produce image data $G_2$ (41-2) (step 103), and stores it in the image memory 33 of the storage section 12. For example, the resolution of the printing section 2 is 600 dpi (dots per inch), and is previously stored in the processing parameter memory 37 of the storage section 12 as a resolution conversion parameter 43.

Next, the control section 11 performs the gradation conversion processing; i.e., converts the gradation of the image data $G_2$ (41-2) to thereby produce image data $G_3$ (41-3) (step 104), and stores it in the image memory 33 of the storage section 12.

In the case of double tone in which a single color image is divided into two images and these images are shifted and overprinted, ideally, a proper printed image is obtained through performance of gradation conversion of 50%. However, in actuality, when the gradation conversion of 50% is performed, a gap formed between the images when they are overprinted. Therefore, gradation conversion of 60% to 65% is performed. Since the optimal gradation conversion varies depending on the resolution of the printing section 2 and the number of lines per inch (hereinafter may be simply referred to as "the number of lines") of an image to be printed, it is desirably stored in the processing parameter memory 37 of the storage section 12 as a gradation conversion parameter 45.

For example, in a case where the resolution is 600 dpi, the percentage is set to 60% when the number of lines is 60 lpi (lines per inch), set to 60% when the number of lines is 75 lpi, set to 65% when the number of lines is 100 lpi, and set to 65% when the number of lines is 120 lpi. These percentages, which are previously set, are stored in the processing parameter memory 37 of the storage section 12, and, at the time of processing, a proper gradation conversion parameter is searched and used.

Subsequently, the control section 11 converts the image data $G_3$ (41-3) obtained through gradation conversion to CMYK data (CMYK separation processing) to thereby produce image data $G_4$ (41-4) (step 105), and stores it in the image memory 33 of the storage section 12. The image data $G_4$ (41-4) is composed of four image data sets; i.e., cyan image data $G_{4C}$, magenta image data $G_{4M}$, yellow image data $G_{4Y}$, and black image data $G_{4K}$.

Next, the control section 11 performs the contour expansion processing for the image data $G_4$ (41-4) obtained through the CMYK separation processing to thereby produce image data $G_5$ (41-5: cyan image data $G_{5C}$, magenta image data $G_{5M}$, yellow image data $G_{5Y}$, and black image data $G_{5K}$) (step 106), and stores it in the image memory 33 of the storage section 12. This contour expansion processing is the core of the image data generation processing of the present embodiment, and will be described in detail later.

The contour expansion processing is suitable for an image as shown in FIG. 15 which includes fine color images masked by a black background, and is most suitable for printing such an image. Contour expansion processing parameters 47 used for the contour expansion processing are also stored in the processing parameter memory 37 of the storage section 12, as in the case of other processing parameters.

Next, the control section 11 performs image shift processing for the respective color image data of the image data $G_5$ (41-5) obtained through the contour expansion processing; i.e., the cyan image data $G_{5C}$, the magenta image data $G_{5M}$, the yellow image data $G_{5Y}$, and the black image data $G_{5K}$, to thereby produce image data $G_6$ (41-6: $G_{6C}$, $G_{6M}$, $G_{6Y}$, $G_{6K}$) and image data $G_7$ (41-7: $G_{7C}$, $G_{7M}$, $G_{7Y}$, $G_{7K}$) (step 107), and stores them in the image memory 33 of the storage section 12.

As the image shift processing, shift processing for performing double-tone printing is performed. Alternatively, color-by-color shift processing and the shift processing for performing double-tone printing are performed simultaneously. At this time, it is assumed that respective image data sets express the C, M, Y, K components with the same angle; for example, the image data sets are of a line screen type (intersection angle: 90°).

In the case where the shift processing for performing double-tone printing is performed, the control section 11 shifts the image data $G_5$ (41-5: $G_{5C}$, $G_{5M}$, $G_{5Y}$, $G_{5K}$) obtained through the contour expansion processing rightward by a predetermined number of pixels L1 to thereby produce the image data $G_6$ (41-6: $G_{6C}$, $G_{6M}$, $G_{6Y}$, $G_{6K}$). Further, the control section 11 shifts the image data $G_6$ (41-6: $G_{6C}$, $G_{6M}$, $G_{6Y}$, $G_{6K}$) downward by a predetermined number of pixels L2 to thereby produce the image data $G_7$ (41-7: $G_{7C}$, $G_{7M}$, $G_{7Y}$, $G_{7K}$) (step 107). The produced image data $G_6$ (41-6: $G_{6C}$, $G_{6M}$, $G_{6Y}$, $G_{6K}$) and the produced image data $G_7$ (41-7: $G_{7C}$, $G_{7M}$, $G_{7Y}$, $G_{7K}$) are stored in the image memory 33 of the storage section 12.

The numbers of pixels L1 and L2 for rightward and downward shifts vary depending on the resolution of the thermal head 23 and the number of lines of an image to be printed. The numbers of pixels L1 and L2 for shifting, which are previously determined, are stored in the processing parameter memory 37 of the storage section 12 as shift processing parameters 49.

For example, when the resolution of the thermal head 23 is 600 dpi, the numbers of pixels L1 and L2 for shifting are previously determined such that L1=5 (rightward by 5 pixels) and L2=5 (downward by 5 pixels) for the case where the number of lines is 60 lpi, L1=4 (rightward by 4 pixels) and L2=4 (downward by 4 pixels) for the case where the number of lines is 75 lpi, L1=3 (rightward by 3 pixels) and L2=3 (downward by 3 pixels) for the case where the number of lines is 100 lpi, and L1=2 (rightward by 2 pixels) and L2=2 (downward by 2 pixels) for the case where the number of lines is 120 lpi. The previously determined numbers of pixels L1 and L2 for shifting are stored in the processing parameter memory 37 as the shift processing parameters 49.

In the case where the color-by-color shift processing and the shift processing for performing double-tone printing are performed simultaneously, the control section 11 shifts the image data $G_5$ (41-5: $G_{5C}$, $G_{5M}$, $G_{5Y}$, $G_{5K}$) obtained through the contour expansion processing rightward by numbers of pixels L3 (L3$_C$, L3$_M$, L3$_Y$, L3$_K$) determined for the respective colors to thereby produce the image data $G_6$ (41-6: $G_{6C}$, $G_{6M}$, $G_{6Y}$, $G_{6K}$). Further, the shift processing for performing double-tone printing is performed. That is, the control section 11 shifts the image data $G_6$ (41-6: $G_{6C}$, $G_{6M}$, $G_{6Y}$, $G_{6K}$) rightward by the predetermined number of pixels L1, and then downward by the predetermined number of pixels L2, to thereby produce the image data $G_7$ (41-7: $G_{7C}$, $G_{7M}$, $G_{7Y}$, $G_{7K}$) (step 107). The produced image data $G_6$ (41-6: $G_{6C}$, $G_{6M}$, $G_{6Y}$, $G_{6K}$) and the produced image data $G_7$ (41-7: $G_{7C}$, $G_{7M}$, $G_{7Y}$, $G_{7K}$) are stored in the image memory 33 of the storage section 12.

The numbers of pixel L3 (L3$_C$, L3$_M$, L3$_Y$, L3$_K$) for the color-by-color shift processing vary depending on the resolution of the thermal head 23 and the number of lines of an image to be printed. These values are previously determined and are stored in the processing parameter memory 37 of the storage section 12 as the shift processing parameter 49. For example, when the resolution of the thermal head 23 is 600 dpi, the numbers of pixels L3 are previously determined as follows. In the case where the number of lines is 60 lpi, C (cyan) is shifted rightward by 2 pixels (L3$_C$=2), M (magenta) is not shifted (L3$_M$=0), Y (yellow) is shifted rightward by 1 pixel (L3$_Y$=1), and K (black) is shifted rightward by 3 pixels (L3$_K$=3). In the case where the number of lines is 75 lpi, L3$_C$=2, L3$_M$=0, L3$_Y$=1, and L3$_K$=3. In the case where the number of lines is 100 lpi, L3$_C$=1, L3$_M$=0, L3$_Y$=1, and L3$_K$=2.

The number of pixels for shifting, which differs among the colors, is set such that the printed image is made flat to thereby prevent the images of different colors from overlapping to a possible extent. Basically, the shift processing is performed while the magenta (M) image is used as a reference. Since the black (K) image produces a large step, the shift amount is increased, and is separated from the images of other colors to a possible extent. Further, since the color difference between the cyan (C) image and the magenta (M) image is large, these images are separated from each other to a possible extent.

After the image shift processing, the control section 11 performs dot processing for the image data $G_6$ (41-6: $G_{6C}$, $G_{6M}$, $G_{6Y}$, $G_{6K}$) and the image data $G_7$ (41-7: $G_{7C}$, $G_{7M}$, $G_{7Y}$, $G_{7K}$) to thereby produce image data $G_8$ (41-8: $G_{8C}$, $G_{8M}$, $G_{8Y}$, $G_{8K}$) and image data $G_9$ (41-9: $G_{9C}$, $G_{9M}$, $G_{9Y}$, $G_{9K}$) (step 108), and stores them into the image memory 33 of the storage section 12.

The matrix size of each dot varies depending on the resolution of the thermal head 23 and the number of lines of an image to be printed. When the resolution is 600 dpi, the matrix size is previously determined to be 10×10 pixels for the case where the number of lines is 60 lpi, 8×8 pixels for the case where the number of lines is 75 lpi, 6×6 pixels for the case where the number of lines is 100 lpi, and 5×5 pixels for the case where the number of lines is 120 lpi. The previously determined matrix sizes are stored in the processing parameter memory 37 of the storage section 12 as dot processing parameters.

The control section 11 performs image reverse shift processing for the image data $G_8$ (41-8: $G_{8C}$, $G_{8M}$, $G_{8Y}$, $G_{8K}$) and the image data $G_9$ (41-9: $G_{9C}$, $G_{9M}$, $G_{9Y}$, $G_{9K}$) obtained through the dot processing, and superposes them on each other to thereby produce image data $G_{10}$ (41-10: $G_{10C}$, $G_{10M}$, $G_{10Y}$, $G_{10K}$) (step 109). The control section 11 stores the image data $G_{10}$ (41-10: $G_{10C}$, $G_{10M}$, $G_{10Y}$, $G_{10K}$) into the image memory 33 of the storage section 12.

The control section 11 ends the image processing 35 and sends the resultant image data $G_{10}$ (41-10: $G_{10C}$, $G_{10M}$, $G_{10Y}$, $G_{10K}$) to the printing section 2 via the cable 3 (step 110). The image data $G_{10}$ (41-10: $G_{10C}$, $G_{10M}$, $G_{10Y}$, $G_{10K}$) is temporarily stored in the buffer memory 21 of the printing section 2, and the printer control section 22 controls the thermal head drive section 24 and the motor drive section 26 so as to print the image (step 111).

The above-described series of processing (steps 101 to 111) enables printing of a good image which does not provide a sensation of roughness and is free of blurring caused by heat accumulation of the thermal head 23 and which is free of formation of white unprinted portion and adhesion failure as shown in FIG. 15.

3. Details of the Contour Expansion Processing

Figure 5:
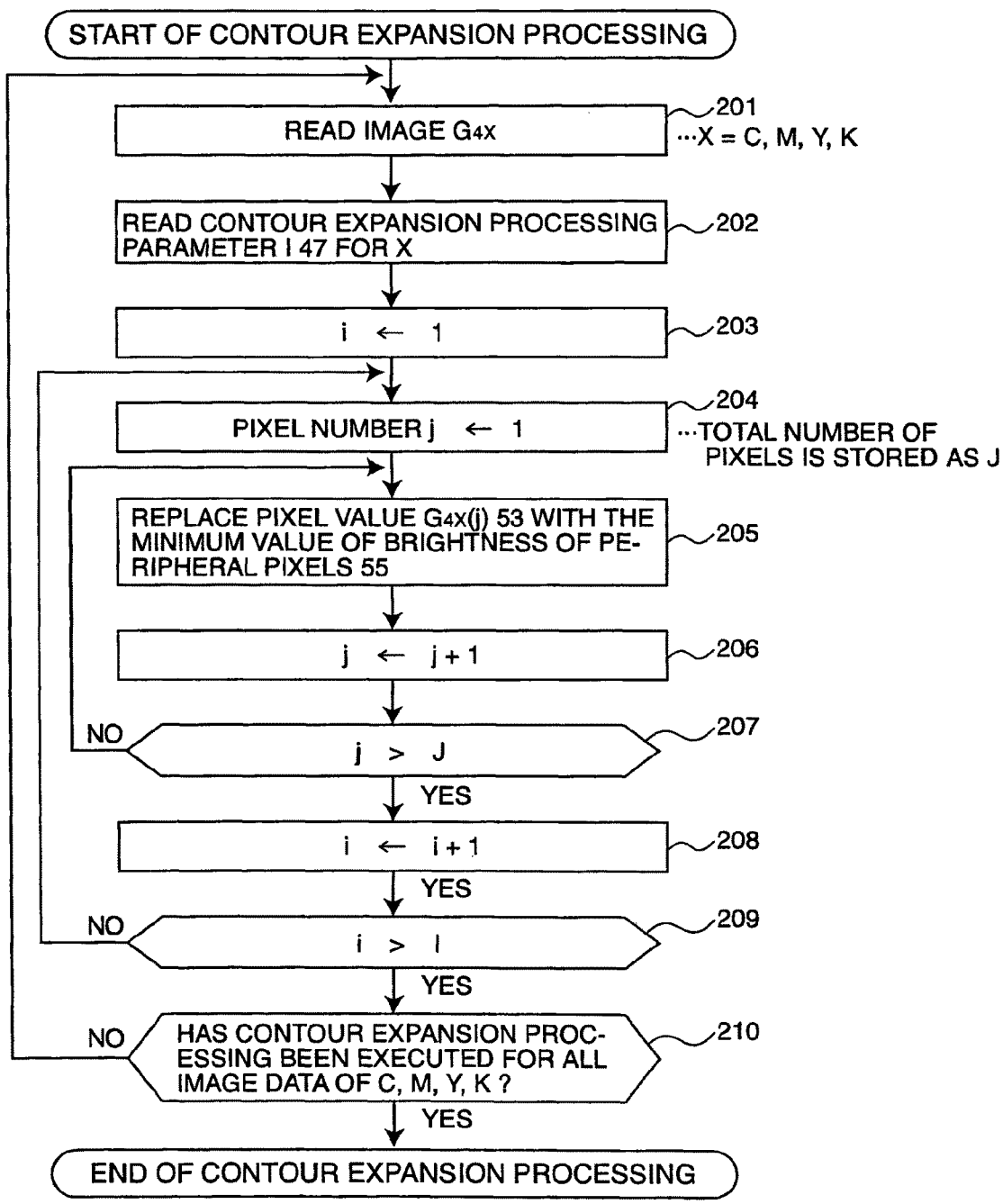
FIG. 5 Flowchart showing the flow of contour expansion processing.
Figure 6:
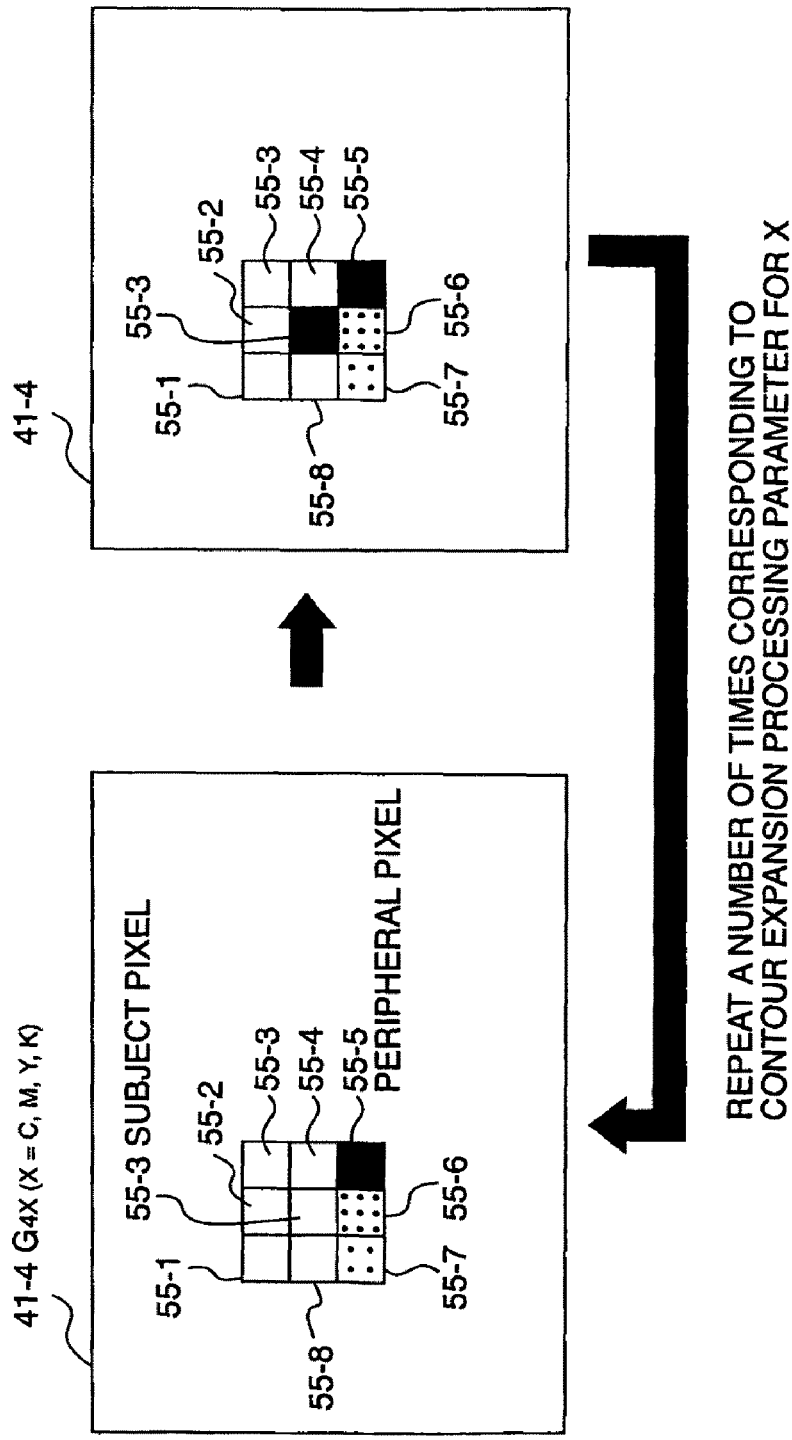
FIG. 6 Illustrations used for explaining the contour expansion processing.
Figure 8:
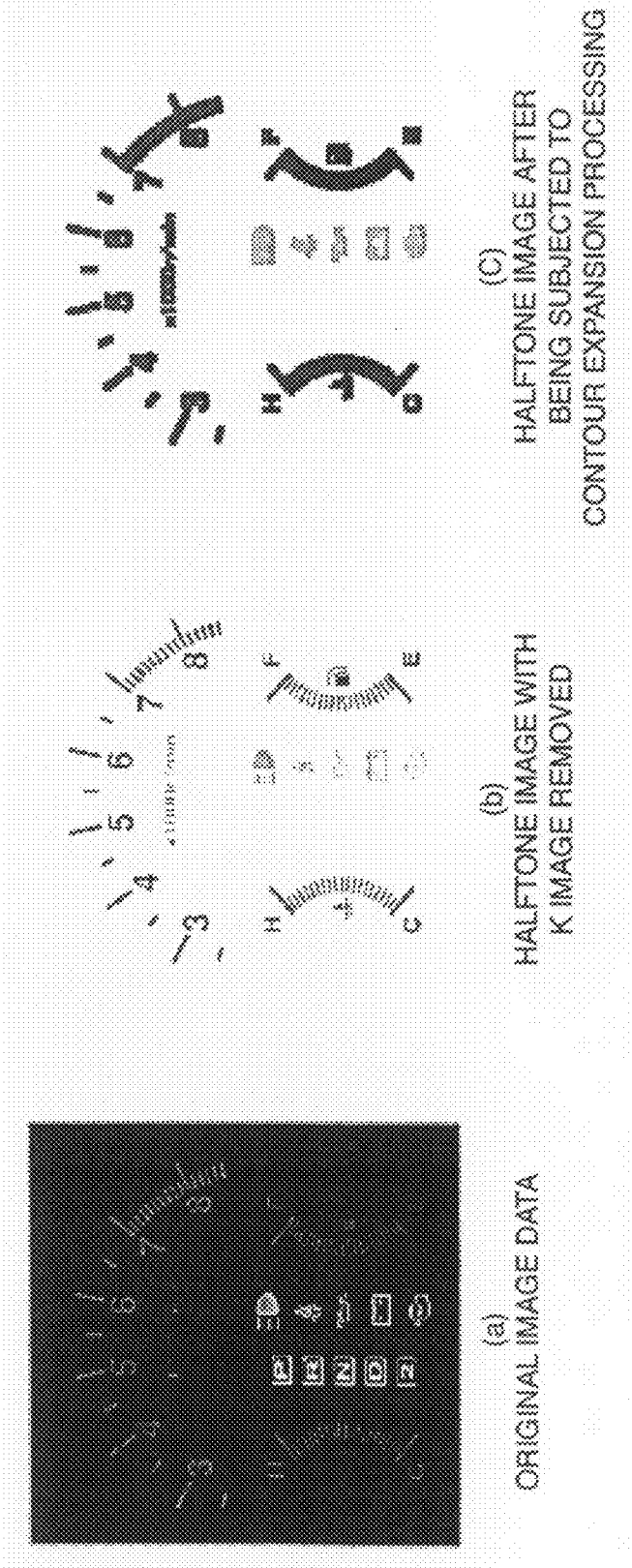
FIG. 8 Illustrations used for explaining the contour expansion processing.
Figure 9:
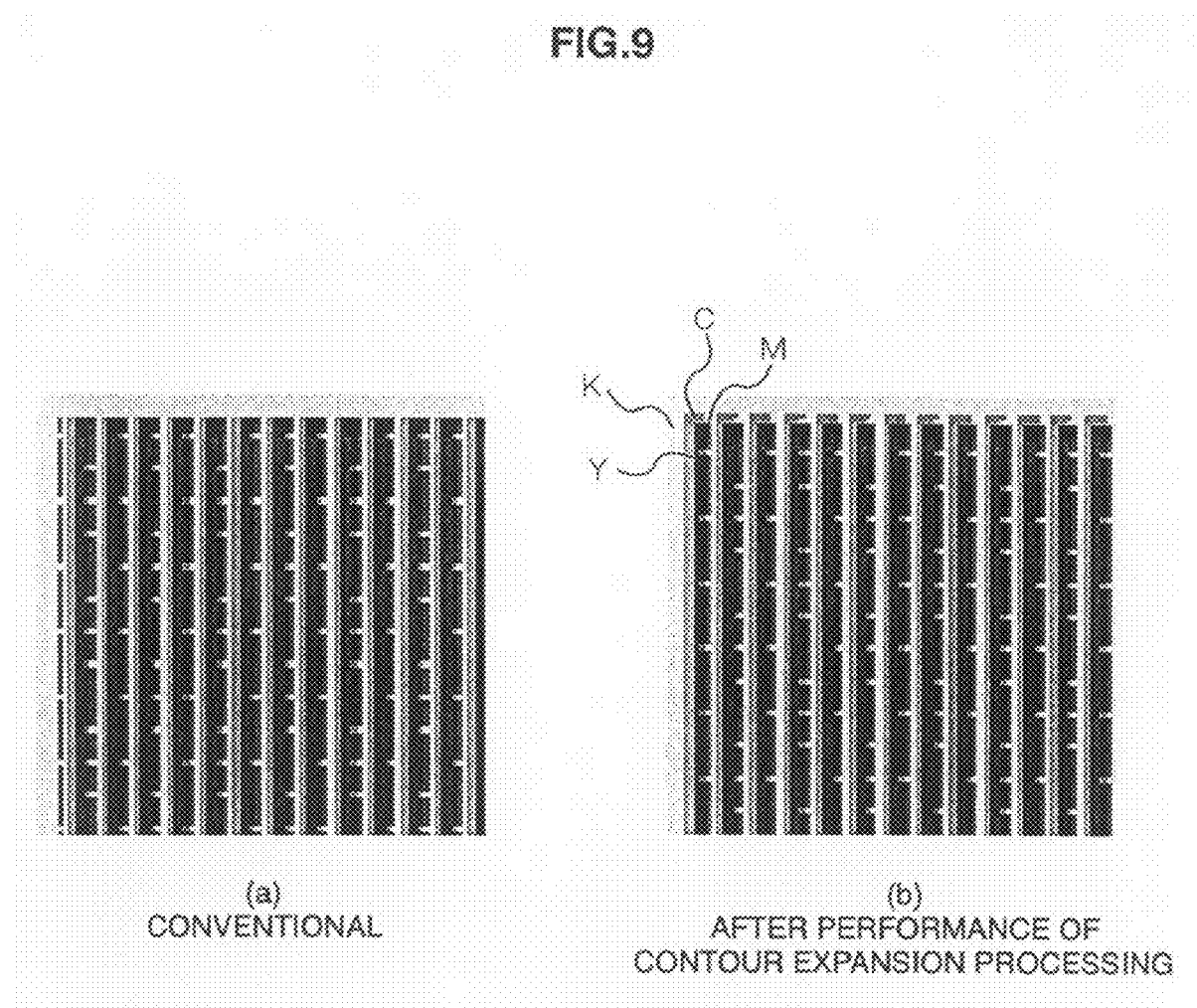
FIG. 9 Illustrations used for explaining the contour expansion processing.

Next, the contour expansion processing of step 106 will be described in detail with reference to FIGS. 5 to 10. FIG. 5 is a flowchart showing the flow of the contour expansion processing. FIG. 6 is a set of illustrations used for explaining the contour expansion processing. FIG. 7 is a table showing an example of contour expansion processing parameters. FIGS. 8 to 10 are illustrations used for explaining the contour expansion processing.

First, the control section 11 of the image data generation apparatus 1 reads out, from the image memory 33 of the storage section 12, the image data $G_{4X}$ (41-4: X=C (cyan), M (magenta), Y (yellow), K (black)) obtained through the CMYK separation processing (step 201).

Further, the control section 11 reads out, from the processing parameter memory 37 of the storage section 12, a contour expansion processing parameters 47 for the image data $G_{4X}$ of color X to be processed (step 202). The contour expansion processing parameters 47 designate, for the respective colors, the number of pixels by which the contour is expanded. The contour expansion processing parameters 47 are previously determined, for example, as shown in FIG. 7; i.e., such that 4 pixels for C (cyan), 2 pixels for M (magenta), 3 pixels for Y (yellow), and 5 pixels for K (black)), and are stored in the processing parameter memory 37 of the storage section 12.

Next, coefficients i and j for processing are set (steps 203 and 204). The coefficient i is used to count the number of pixels for contour processing, and j represents the pixel number of a pixel to be processed. i changes from 1 to I, and j changes from 1 to J (the total number of pixels of the image data G).

As shown in FIG. 6, the contour expansion processing refers to pixel values of pixels (peripheral pixels 55: e.g., 55-1 to 55-8) around a pixel to be processed (subject pixel 53), and replaces the pixel value of the subject pixel 53 with the pixel value of a peripheral pixel whose brightness is the lowest among the peripheral pixels 55 (step 205).

As shown in FIG. 6, the pixel value of the subject pixel 53 is replaced with the pixel value of the peripheral pixel 55-5 whose brightness is the lowest among the peripheral pixels 55-1 to 55-8

Steps 206 and 207 cause the processing (step 205) to be performed for all the pixels (j=1 to J).

Steps 208 and 209 cause the above-described processing (steps 205 to 207) to be repeated a number of times corresponding to the contour expansion processing parameter I determined for each color. With this processing, the contour of the image of the corresponding color is expanded by the number of pixels designated by the contour expansion processing parameter I determined for each color.

Further, step 210 causes the above-described processing (steps 201 to 209) to be repeated for all the colors C, M, Y, K).

When it is determined that the contour expansion processing has been performed for all the colors (YES in step 210), the contour expansion processing is ended.

For an image masked with a black background, the above-described contour expansion processing is not performed for black (K) and is performed only for C (cyan), M (magenta), and Y (yellow).

FIG. 8 is a set of illustrations used for describing the contour expansion processing performed on an actual image.

FIG. 8(a) shows an original image. In FIG. 8(a), the original image is shown as a monochrome image. However, in actuality, the image includes color graduations of a tachometer, a water temperature meter, a fuel meter, and other color marks on a back background.

Here, there will be considered the case where this image is printed on a polycarbonate film via an intermediate transfer film.

FIG. 8(b) shows an image obtained by removing K (black) from the original image.

Conventionally, the original image is separated into images of C, M, Y, and K through CMYK separation processing, and the images of C, M, and Y shown in FIG. 8(b) and the image of K (black background) are printed in a superposed manner as they are. Therefore, due to printing shift or the like, white unprinted portions as shown in FIG. 15 are formed. In contrast, in the thermal transfer recording apparatus of the present embodiment, the contour expansion processing is performed for the images of C, M, and Y obtained through the CMYK separation processing, to thereby expand the contours of the images of C, M, and Y as shown in FIG. 8(c). When the images shown in FIG. 8(c) and the image of K obtained through the CMYK separation processing are printed in a superposed manner, white unprinted portions can be eliminated.

Conventionally, the contour expansion processing is not performed. Therefore, as shown in FIG. 9(a), white unprinted portions may be formed due to a positional shift of the boundaries between the dot images of C, M, Y, and K and the black image during printing, and the superposed dots of the four colors (C, M, Y, K) form large steps, so that an adhesion failure may occur in the back background masking portion.

In contrast, in the thermal transfer recording apparatus of the present embodiment, the contour expansion processing is employed, and the amount of contour expansion is changed among the four colors (C, M, Y, K). Thus, as shown in FIG. 9(b), the steps of dots of C, M, Y, and K can be reduced, and the adhesion failure at the back masking portion can be mitigated.

FIG. 10 is a set of illustrations used for describing the thermal transfer recording process of the present embodiment for the case where an image which includes a color pattern on a black background is printed on a polycarbonate film.

As shown in FIG. 10(a), an intermediate transfer film 61 is masked with a black color image 73. Subsequently, in accordance with the image data $G_{10}$ (41-10: $G_{10C}$, $G_{10M}$, $G_{10Y}$, $G_{10K}$) obtained through the processing of FIG. 5, images of C, Y and M are printed in a descending order in terms of the number of pixels by which the contour is expanded. For example, the image of C 65, the image of Y 67, and the image of M 69 are printed in this sequence. Subsequently, white backing is applied (white backing portion 63).

The printed images of the intermediate transfer film 61 are transferred onto a polycarbonate film 75 (FIG. 10(b)).

Since contour expansion is performed, white unprinted portions are not formed between the color images and the black masking portion 73. Further, since the number of pixels by which the contour is expanded is changed among the colors, the printed portion has a stepped shape. Therefore, smaller steps are formed when the images are transferred onto the polycarbonate film, so that adhesion failure becomes less likely to occur.

4. Second Embodiment

Figure 11:
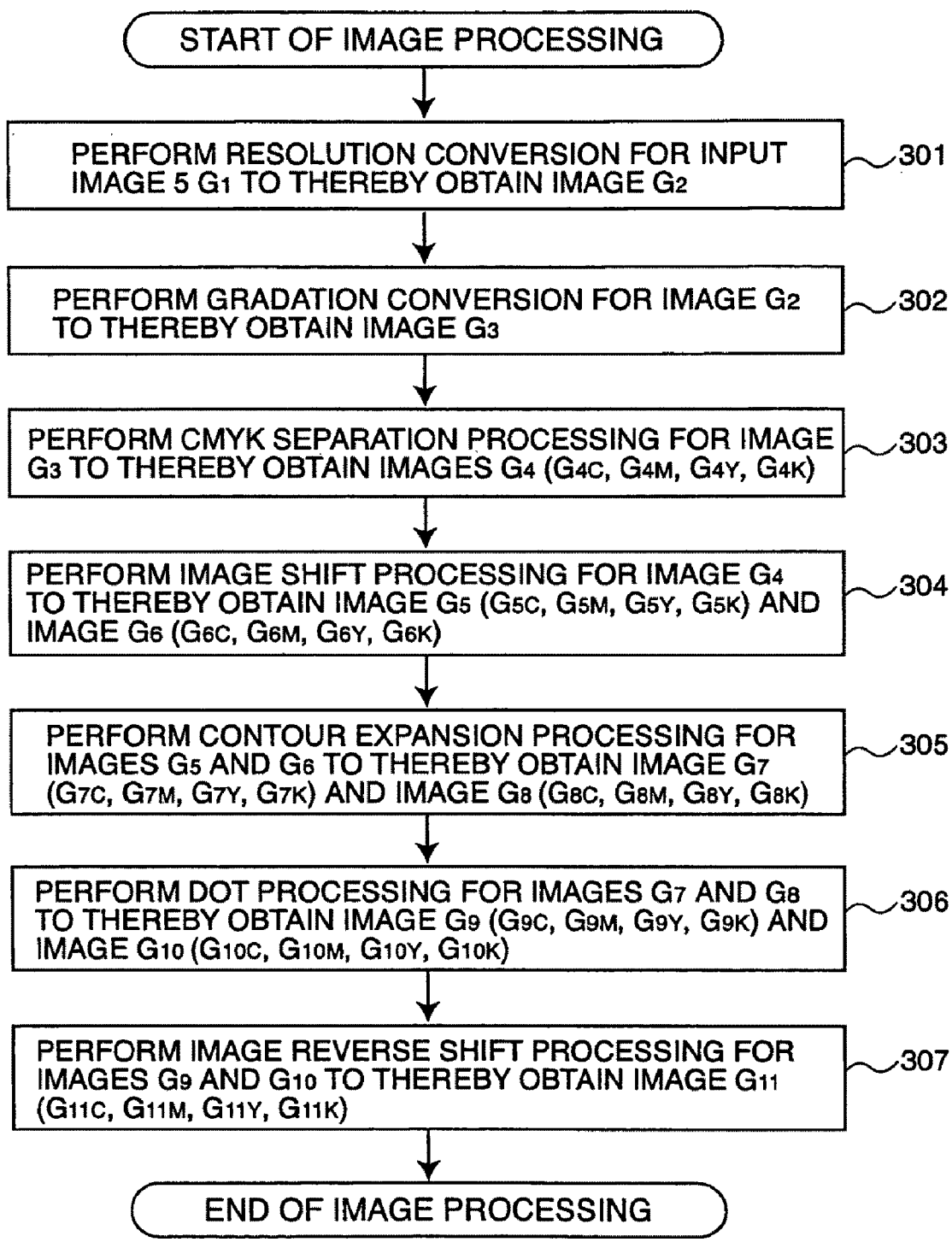
FIG. 11 Flowchart showing the flow of image processing according to a second embodiment.

FIG. 11 is a flowchart showing the flow of the image processing 35 according to a second embodiment of the present invention. FIG. 12 is a table showing processing parameters used in the contour expansion processing. The present embodiment differs from the first embodiment in that the contour expansion processing is performed on imaged data having undergone image shift.

Like the image processing 35 of the first embodiment, in the image processing 35 of the present embodiment, the control section 11 first performs the resolution conversion processing for the input image data 5 ($G_1$) to thereby obtain image data $G_2$ (step 301), performs the gradation conversion processing for the image data $G_2$ to thereby obtain image data $G_3$ (step 302), and performs the CMYK separation processing for the image data $G_3$ to thereby obtain image data $G_4$ ($G_{4C}$, $G_{4M}$, $G_{4Y}$, $G_{4K}$) (step 303). The processing up to this point is the same as the processing of steps 103 to 105 of the first flow chart shown in FIG. 3.

In the first embodiment, the control section 11 performs the contour expansion processing after that. In contrast, in the second embodiment, the image shift processing is first performed for the image data $G_4$ ($G_{4C}$, $G_{4M}$, $G_{4Y}$, $G_{4K}$) so as to obtain image data $G_5$ ($G_{5C}$, $G_{5M}$, $G_{5Y}$, $G_{5K}$) and image data $G_6$ ($G_{6C}$, $G_{6M}$, $G_{6Y}$, $G_{6K}$) (step 304).

The image shift processing is performed in the same manner as the image shift processing described in relation to the first embodiment. That is, the shift processing for performing double-tone printing is performed; or the color-by-color shift processing and the shift processing for performing double-tone printing are performed simultaneously.

Next, the control section 11 performs the contour expansion processing for both the image data $G_5$ ($G_{5C}$, $G_{5M}$, $G_{5Y}$, $G_{5K}$) and the image data $G_6$ ($G_{6C}$, $G_{6M}$, $G_{6Y}$, $G_{6K}$) obtained through the image shift processing.

Although the contour expansion processing performed for both the image data sets $G_5$ and $G_6$ is identical with that shown in FIG. 5, the contour expansion processing parameter I is set to different values for the image data sets $G_5$ and $G_6$. FIG. 12 shows example values of the contour expansion processing parameter.

For example, when the contour expansion processing is performed for the image data $G_5$ ($G_{5C}$, $G_{5M}$, $G_{5Y}$, $G_{5K}$), the contour expansion processing is performed 7 times for C (cyan), 3 times for M (magenta), 5 times for Y (yellow), and 10 times for K (black); and when the contour expansion processing is performed for the image data $G_6$ ($G_{6C}$, $G_{6M}$, $G_{6Y}$, $G_{6K}$), the contour expansion processing is performed 8 times for C, 4 times for M, 6 times for Y, and 9 times for K.

Through changing the contour expansion processing parameter, there can be obtained two sets of image data $G_7$ ($G_{7C}$, $G_{7M}$, $G_{7Y}$, $G_{7K}$) and image data $G_8$ ($G_{8C}$, $G_{8M}$, $G_{8Y}$, $G_{8K}$) which differ in expansion width.

Subsequently, the control section 11 performs dot processing for the image data $G_7$ ($G_{7C}$, $G_{7M}$, $G_{7Y}$, $G_{7K}$) and the image data $G_8$ ($G_{8C}$, $G_{8M}$, $G_{8Y}$, $G_{8K}$) obtained through the contour expansion processing, to thereby obtain image data $G_9$ ($G_{9C}$, $G_{9M}$, $G_{9Y}$, $G_{9K}$) and image data $G_{10}$ ($G_{10C}$, $G_{10M}$, $G_{10Y}$, $G_{10K}$).

The dot processing is also the same as that of the first processing.

Next, the control section 11 performs the image reverse shift processing for the image data $G_9$ ($G_{9C}$, $G_{9M}$, $G_{9Y}$, $G_{9K}$) and the image data $G_{10}$ ($G_{10C}$, $G_{10M}$, $G_{10Y}$, $G_{10K}$) to thereby obtain image data $G_{11}$ ($G_{11C}$, $G_{11M}$, $G_{11Y}$, $G_{11K}$).

In the image reverse shift processing, each image data set is shifted in the opposite direction by the same number of pixels as the number of pixels by which the corresponding image data set was shifted in the above-described image shift processing. Thus, the image returns to its original position.

The image data $G_{11}$ ($G_{11C}$, $G_{11M}$, $G_{11Y}$, $G_{11K}$) for printing is obtained through the above-described processing, and the control section 11 sends this image data to the printing section 2 via the cable 3. In response thereto, printing processing is performed under the control of the printing control section 22 of the printing section 2.

Even in the case where the contour expansion processing is performed after the image shift processing as described above, the same effects as those of the first embodiment are attained. That is, contour expansion enables obtainment of a printed image which includes no while unprinted portion. Further, since the width of contour expansion is changed among the four colors (C, M, Y, K), the steps of the superposed ink layers can be reduced, and there can be obtained a printed image which is free of adhesion failure.

5. Third Embodiment

Figure 13:
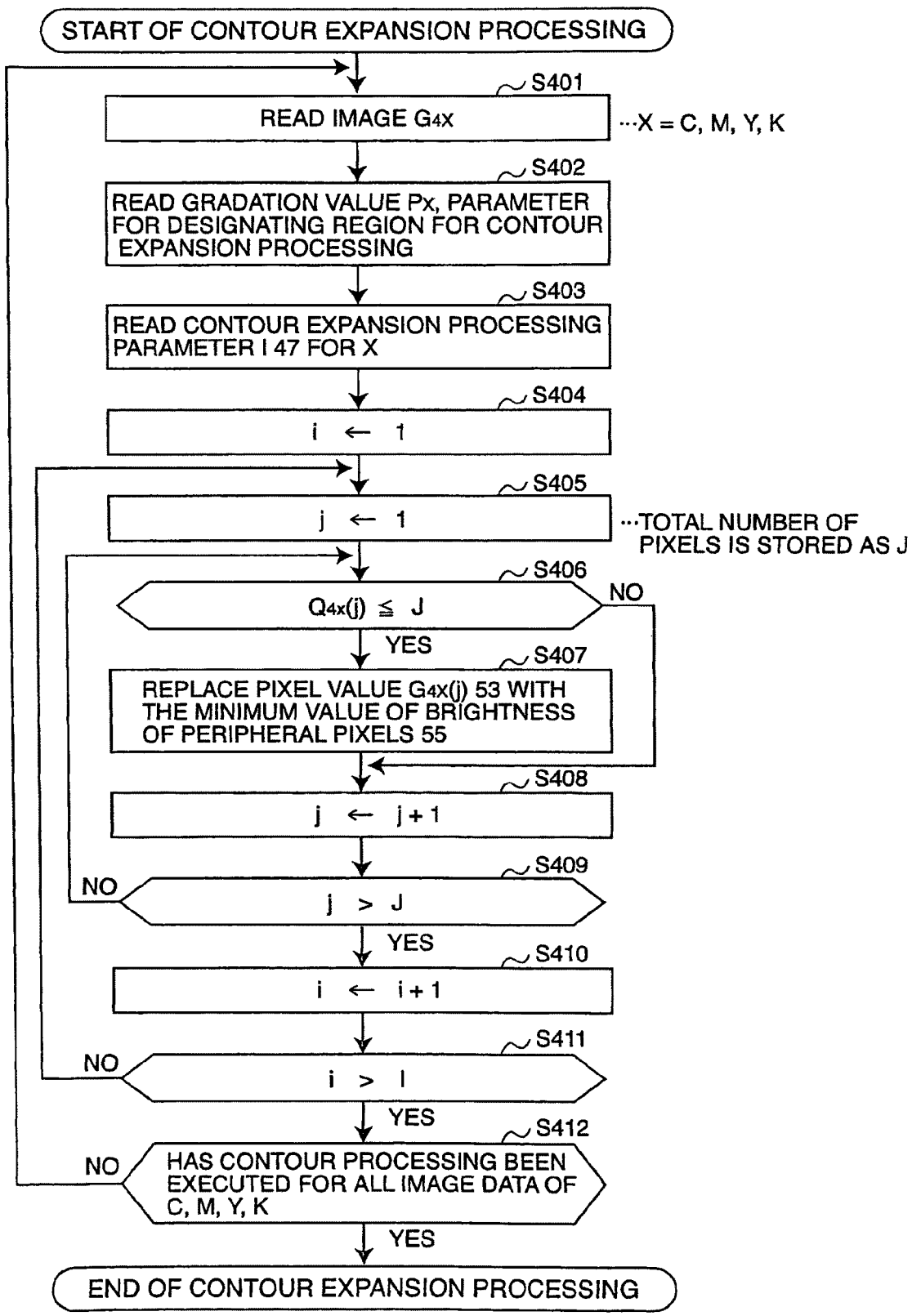
FIG. 13 Flowchart showing the flow of contour expansion processing according to a third embodiment.

FIG. 13 is a flowchart showing the flow of contour expansion processing according to a third embodiment of the present invention.

This processing can be executed as the contour expansion processing (step 106 of FIG. 3) in the image processing 35 of the present invention described in relation to the first embodiment, or the contour expansion processing (step 305 of FIG. 11) in the image processing 35 described in relation to the second embodiment.

This contour expansion processing differs from the contour expansion processing of FIG. 5 in that processing for selecting, on the basis of gradation value, pixels for which the contour expansion processing is performed is added so as to perform the contour expansion processing only for the selected pixels.

First, the control section 11 of the image data generation apparatus 1 reads out, from the image memory 33 of the storage section 12, the image data $G_{4X}$ (41-4: X=C (cyan), M (magenta), Y (yellow), K (black)) obtained through the CMYK separation processing (step 401).

Next, the control section 11 reads out a parameter $P_X$ which designates a region for which the contour expansion processing is performed (step 402).

This parameter $P_X$ is a parameter for designating a color region for which the contour expansion processing is performed, and is a specific gradation value, for example. This parameter is previously determined, and is stored in the storage section 12 as the contour expansion processing parameter 47.

FIG. 14 shows an example of this contour expansion region designation parameter $P_X$.

As shown in this example, a gradation value of 0 is used as the parameter $P_X$ for all the image data X=C (cyan), M (magenta), Y (yellow), K (black).

The parameter $P_X$ is not limited to this value, and may be set to different values depending on an image.

Further, the control section 11 reads out, from the processing parameter memory 37 of the storage section 12, a contour expansion processing parameter I (47) for the image data $G_{4X}$ of color X to be subjected to the contour expansion processing (step 403). The contour expansion processing parameter 47 may be the same as that described in relation to the first embodiment (e.g., FIG. 7).

Next, coefficients i and j for processing are set (steps 404 and 405). The coefficient i is used to count the number of pixels for contour processing, and j represents the pixel number of a pixel to be processed. i changes from 1 to I, and j changes from 1 to J (the total number of pixels of the image data G).

Next, the control section 11 selects pixels for which the contour expansion processing is performed (step 406).

The control section 11 compares the pixel value of a pixel $G_{4X}(j)$ to be processed with the contour expansion region designation parameter $P_X$, and performs the contour expansion processing (step 407) only when the pixel value of the pixel $G_{4X}(j)$ is not greater than the parameter $P_X$ (YES in step 406). When the pixel value of the pixel $G_{4X}(j)$ is greater than the parameter $P_X$ (NO in step 406), the contour expansion processing (step 407) is not performed.

In the case of the contour expansion region designation parameter $P_X$ shown in FIG. 14, the contour expansion processing (step 407) is performed when the gradation value of the subject pixel $G_{4X}(j)$ is zero.

The contour expansion processing is the same as that employed in the first embodiment and described with reference to FIG. 6.

Steps 408 and 409 controls the processing flow such that the processing of selecting pixels to be subjected to the contour expansion processing (step 406) and the contour expansion processing (step 407) are performed for all the pixels (j=1 to J).

Steps 410 and 411 cause the above-described processing (steps 406 to 409) to be repeated a number of times corresponding to the contour expansion processing parameter I determined for each color. With this processing, only for the pixels selected as the contour expansion processing region, the contour of the image of the corresponding color is expanded by the number of pixels designated by the contour expansion processing parameter I determined for each color.

Further, step 412 causes the above-described processing (steps 401 to 411) to be repeated for all the colors C, M, Y, K).

When it is determined that the contour expansion processing has been performed for all the colors (YES in step 412), the contour expansion processing is ended.

By virtue of the above-described processing, it becomes possible to perform the contour expansion processing only for pixels in a previously designated color region, and protect images in color regions other than the designated color region. Further, by means of designating only a small white region of image data as a color region for which the contour expansion processing is performed, an influence of a step between the small white region and an edge portion of an image can be mitigated. Accordingly, it becomes possible to prevent occurrence of adhesion failure, which would otherwise occur when white backing is applied.

The present invention is not limited to the above-described embodiments, various modifications is possible, and such modifications also fall within the technical scope of the present invention.

The invention claimed is:

1. A thermal transfer recording apparatus including a thermal head, comprising:
   image data acquisition means for acquiring original image data of RGB;
   color separation means for performing gradation conversion and then color separation for the original image data of RGB acquired by the image data acquisition means so as to obtain image data sets of C, M, Y, and K;
   contour expansion means for expanding the image data sets obtained by the color separation means by different numbers of pixels, respectively;
   shift means for shifting the image data sets, which have been expanded by the contour expansion means, by different numbers of pixels, respectively;
   dot conversion means for performing dot conversion processing for the image data sets shifted by the shift means;
   printing data generation means for superposing the image data sets processed by the dot conversion means so as to generate printing data; and
   printing means for printing the printing data generated by the printing data generation means so as to obtain a printed object.

2. A thermal transfer recording apparatus according to claim 1, wherein the contour expansion means replaces a value of each pixel contained in each of the image data sets obtained through color separation with a minimum value of brightness of pixels around the pixel, and repeats this processing a predetermined number of times determined for each of the image data sets obtained through color separation, to thereby expand each of the image data sets by pixels, the number of which corresponds to the number of times.

3. A thermal transfer recording apparatus according to claim 1, wherein the contour expansion means includes contour expansion pixel selection means for selecting pixels to be subjected to expansion processing in accordance with a predetermined color region.

4. A thermal transfer recording apparatus according to claim 3, wherein the color region is a region whose gradation value is 0%.

5. A thermal transfer recording apparatus including a thermal head, comprising:
   image data acquisition means for acquiring original image data of RGB;
   color separation means for performing gradation conversion and then color separation for the original image data of RGB acquired by the image data acquisition means so as to obtain image data sets of C, M, Y, and K;
   shift means for shifting the image data sets, which have been obtained by the color separation means, by different numbers of pixels, respectively;
   contour expansion means for expanding the image data sets, which have been shifted by the shift means, by different numbers of pixels, respectively;
   dot conversion means for performing dot conversion processing for the image data sets expanded by the contour expansion means;
   printing data generation means for superposing the image data sets processed by the dot conversion means so as to generate printing data; and
   printing means for printing the printing data generated by the printing data generation means so as to obtain a printed object.

6. A thermal transfer recording apparatus according to claim 5, wherein the contour expansion means replaces a value of each pixel contained in each of the image data sets obtained through color separation with a minimum value of brightness of pixels around the pixel, and repeats this processing a predetermined number of times determined for each of the image data sets obtained through color separation, to thereby expand each of the image data sets by pixels, the number of which corresponds to the number of times.

7. A thermal transfer recording apparatus according to claim 5, wherein the contour expansion means includes contour expansion pixel selection means for selecting pixels to be subjected to expansion processing in accordance with a predetermined color region.

8. A thermal transfer recording apparatus according to claim 7, wherein the color region is a region whose gradation value is 0%.

9. An image forming method comprising:
acquiring original image data of RGB;
performing gradation conversion and then color separation for the original image data of RGB so as to obtain image data sets of C, M, Y, and K;
expanding the image data sets obtained through color separation by different numbers of pixels, respectively;
shifting the expanded image data sets by different numbers of pixels, respectively;
performing dot conversion processing for the shifted image data sets;
superposing the image data sets, having undergone the dot conversion, so as to generate printing data; and
printing the printing data so as to obtain a printed object.

10. An image forming method according to claim 9, wherein the expanding step replaces a value of each pixel contained in each of the image data sets obtained through color separation with a minimum value of brightness of pixels around the pixel, and repeats this processing a predetermined number of times determined for each of the image data sets obtained through color separation, to thereby expand each of the image data sets by pixels, the number of which corresponds to the number of times.

11. An image forming method according to claim 10, wherein the expanding step includes a step of selecting pixels to be subjected to expansion processing in accordance with a predetermined color region.

12. An image forming method according to claim 11, wherein the color region is a region whose gradation value is 0%.

13. An image forming method characterized by comprising:
acquiring original image data of RGB;
performing gradation conversion and then color separation for the original image data of RGB so as to obtain image data sets of C, M, Y, and K;
shifting the image data sets obtained through color separation by different numbers of pixels, respectively;
expanding the shifted mage data sets by different numbers of pixels, respectively;
performing dot conversion processing for the expanded image data sets;
superposing the image data sets, having undergone the dot conversion, so as to generate printing data; and
printing the printing data so as to obtain a printed object.

14. An image forming method according to claim 13, wherein the expanding step replaces a value of each pixel contained in each of the image data sets obtained through color separation with a minimum value of brightness of pixels around the pixel, and repeats this processing a predetermined number of times determined for each of the image data sets obtained through color separation, to thereby expand each of the image data sets by pixels, the number of which corresponds to the number of times.

15. An image forming method according to claim 14, wherein the expanding step includes a step of selecting pixels to be subjected to expansion processing in accordance with a predetermined color region.

16. An image forming method according to claim 15, wherein the color region is a region whose gradation value is 0%.

* * * * *